C. L. VAN NESS & F. A. KRUSEMARK.
CUSHION TIRE.
APPLICATION FILED SEPT. 10, 1917.
1,277,789.
Patented Sept. 3, 1918.
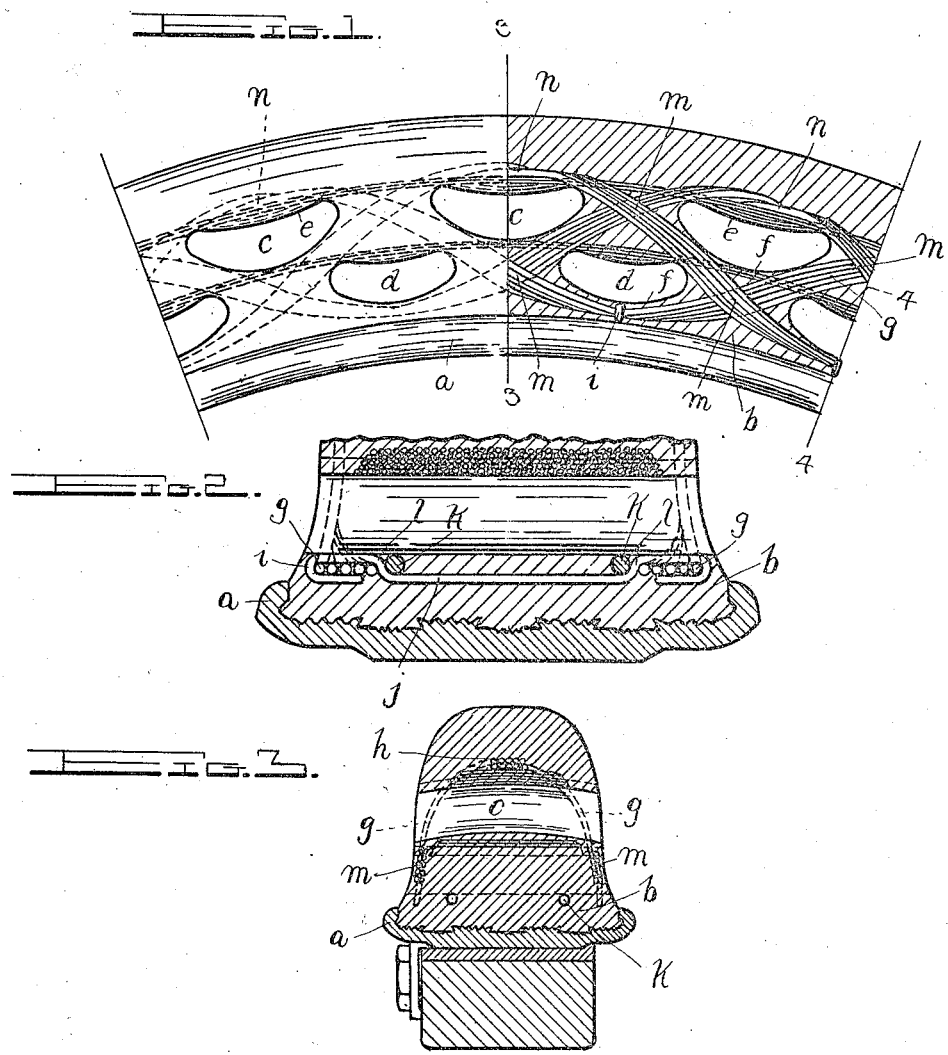
Clair L. Van Ness
Frederick A. Krusemark,
INVENTORS,
BY Davis & Davis,
ATTORNEYS.

UNITED STATES PATENT OFFICE.

CLAIR L. VAN NESS, OF AKRON, OHIO, AND FREDERICK A. KRUSEMARK, OF ROANOKE, VIRGINIA, ASSIGNORS TO K F & C TIRE & RUBBER CORPORATION, OF ROANOKE, VIRGINIA, A CORPORATION OF VIRGINIA.

CUSHION-TIRE.

1,277,789.

Specification of Letters Patent.

Patented Sept. 3, 1918.

Application filed September 10, 1917. Serial No. 190,539.

*To all whom it may concern:*

Be it known that we, CLAIR L. VAN NESS and FREDERICK A. KRUSEMARK, citizens of the United States of America, and residents of Akron, county of Summit, and State of Ohio, and Roanoke, county of Roanoke, and State of Virginia, respectively, have invented certain new and useful Improvements in Cushion-Tires, of which the following is a full and clear specification.

This invention has relation to cushion or airless tires, and its object is to increase the resiliency and durability of the tire, and particularly to avoid the disastrous effects of heavy side or skidding strains, as more fully hereinafter set forth.

In the drawing—

Figure 1 is partly a side elevation and partly a circumferential section of a portion of a tire constructed in accordance with our invention;

Fig. 2 is an enlarged transverse section taken through the base portion of a tire, along line 4—4, Fig. 1; and Fig. 3 is a transverse section of Fig. 1 on line 3—3.

In the drawing, *a* designates the usual metal rim provided with the usual tire-gripping flanges and roughened interior face. The tire is constructed of a solid mass of rubber whose outer portion is, as usual, soft and resilient while the base portion *b*, namely, the part which is anchored in the rim, is hardened. We illustrate our invention as applied to a tire constructed in accordance with the Funkhouser, Krusemark and Carpenter application Serial No. 187,504, filed August 21, 1917, but it will be understood that our invention is not restricted in its application to that type of tire. As in the Funkhouser *et al.* tire, we provide an outer series of slots *c* and an inner series of slots *d*, these slots being staggered with reference to each other and extending circumferentially of the tire. Our present slot arrangement differs from the Funkhouser *et al.* arrangement of slots in that the outer wall *e* of each of the slots *c* is convexed outwardly, that is, toward the tread to form an arch structure, to thereby increase the strength and resiliency of the tread portion of the tire. The curvature of this arch extends from one side of the tire to the other, that is, transversely of the tire, as shown in Fig. 3. The wall *e* also arches inwardly longitudinally of the slot, as in the aforesaid Funkhouser *et al.* application. Our slot arrangement differs also in that the inner wall *f* of each of the slots *c* and *d* is curved inwardly toward the rim, to correspond substantially with the inward curvature of the outer wall of each slot, so that when the tire is under excessive load or receives a blow of excessive severity and is thereby collapsed to the extent of closing the slots, said outer and inner walls of the slots will fit or abut each other and thus prevent disruption of the tire by a crushing action.

Embedded in the tire and extending continuously its entire length is a plurality of (preferably six) bands *g* of textile or fibrous material, each band consisting preferably of a series of cords lying side by side and embedded in the rubber mass. Each of these bands is arranged in a spiral or serpentine manner in the tire, that is, each band curves or dips down on one side of the tire to a point near the rim, following substantially the exterior surface of the tire, and then curves spirally across and through the tread portion of the tire and down upon the other side of the tire, where it is again anchored at a point near the rim, so that, at points *h* along the tread portion of the tire, these bands cross each other and lie preferably in contact with each other at this crossing point. At points where the bands lie in the hardened base portion *b* of the tire, they are anchored in a metallic eye or loop *i*. Each pair of opposite eyes is connected by a wire rod *j* which is bent inwardly toward the rim, this rod *j* being, of course, embedded in the hardened part *b* of the tire. To anchor the bar *j* and its anchoring loops *i*, we provide a pair of circumferentially-extending rods *k* embedded in the hardened part *b* of the tire, just inside the inner slots *d*, these rods engaging the shouldered parts *l* of the rod *j*.

The loops *i* are elongated transversely of the tire, so that the band *g* in passing through the loops will lie flatwise of the tire base, that is, with their faces parallel or substantially parallel to the rim. The bands *g*, as will be seen, not only cross at points *h* centrally of the tread portion of the tire, but also at points *m* at the sides of the tire.

It will be observed that with this spiral or serpentine cord-band, a side pressure or strain at any point in the tire will immediately bring into tension at least one of the bands, and that the tension of the band will be transmitted and distributed along the band circumferentially of the tire to a distance depending upon the severity of the strain. In this way it will be observed that we provide effectively against tearing or disrupting the tire by heavy side or skidding thrusts. An important feature lies in embedding or anchoring the bands at intervals along the tire in the hardened base portion thereof, so that the greater part of the strain caused by side thrusts of the tire will be transmitted directly to the rim of the tire. By flattening the bands out parallel with the rim at the anchoring points $i$, it will be seen that uniform tension is maintained on the cords composing the bands. It will be seen also that it is important that the bands will lie close to the sides of the tire, so that sidewise distortion of the tire at any point will immediately bring the bands into action and thus tend to restore the tire to normal shape. This special arrangement of bands is advantageous for the further reason that it tends to maintain the tire in its molded shape for a long period of time, comparatively.

Our structure results in a very strong design which will quickly repel the depression as the tire leaves the traction position. It also reinforces that portion of the tire which should absorb all the shock as near the surface of the tread as possible, which does more to effect resiliency than any other means, since it is well known that by extending the effort of the depression nearer the base of the tire, it produces a great internal friction, increasing the heat and disintegration.

The cavities near the rim do not receive so great an action as the outer cavities and therefore it is not necessary to arch these across the section. The bands pass across each other directly over each of the outer cavities and thus form, together with the other reinforcing strain-distributing fabrics embedded in the tire, pad-like bodies over the openings, the outer surfaces of the bands being perfectly curved to a true circle. The bands are preferably composed of cord fabric or similar fiber construction, placing the tension strain around the top of these cavities. The reinforcing pads act as tension members between the cavities and across the span. The function of this construction is to lighten the weight of the tire and yet not permit compression to extend too great a distance into the mass of rubber, thus minimizing heat.

As shown in the drawing, the cords or bands passing around the length of the tire spirally increase the tendency to re-act under the compression strain, which will bring the tire to its normal position when the strain is released—producing resiliency. These cords are molded into the tire near the surface of the side walls as close to the tread as is consistent with the wear to be provided for, so as not to expose the bands until the maximum of mileage is obtained. The greatest function of these bands, of course, is to retain the strength under pressure of the side thrust which is very evident on all vehicles, being approximately ten times greater than the traction strain. Considering the side thrust delivered to the tread as shown in Fig. 3, the point adjacent the bead or flange of the rim will act as a fulcrum around which the entire section tends to swing. This will give an enormous strain upon the side where the shock is received and will produce a tension stress on the cords therein. This strain does not come directly to the rim, but is absorbed through the inner side of the tire diagonally away from the point of contact to the base of the tire. This construction gradually absorbs the entire shock which is very slight at the base of the tire, from which point it is pulling. These cords pass over the section of the tire, hooking at the base and returning from the same diagonally over to the opposite side. In crossing over the cavities and the side walls, the bands reinforce or "fabricate" the entire construction and thus bind or incase the entire structure and thus increase the resiliency and buoyancy of the rubber. Applying a shock to the tread will depress it whereupon the rubber is forced out at the side and then these strong cables quickly cause the side walls to rebound in and force the tread out again—a condition which no airless tire that we are familiar with is able to produce. The cords are stretched tightly around the tire and are anchored ingeniously at the base thereof to a wire hook-like appliance that is embedded in the hard rubber base, this anchoring device being retained by two annular rings which are molded in the hard rubber portion of the base. It will be observed that the wire hooks are very simple and that the rings prevent the cords from rising from their seat under strain. The design and location of the cords insure their overcoming the side thrust as they are anchored far apart, and the height is not too great to retain all their power, enabling a tire of maximum height to be used and still so reinforced that the resiliency obtained is the maximum for the action applied on the rubber to prevent the tearing apart of any section or part.

Our cord-like bands serve to hold the sides laced in their proper position, relieving any tendency to permanently set that will naturally occur in the rubber. This keeps the tire fresh and lively and in perfect condition at all times, and will thus produce the maximum efficiency that can be obtained on any pleasure vehicle besides being specially advantageous on motor trucks.

The nature and scope of the invention having been thus indicated and its preferred embodiment having been specifically described, what is claimed as new is:

1. A cushion tire of elastic material provided with a circumferential series of openings extending from side to side and having embedded in it a series of spirally-arranged fibrous bands crossing each other in the tread portion of the tire directly over each of said openings.

2. A cushion tire of elastic material provided with a circumferential series of openings extending from side to side and having embedded in it a series of spirally-arranged fibrous bands crossing each other in the tread portion of the tire directly over each of said openings, said bands crossing each other also at the sides of the tire at points between the openings.

3. A tire of elastic material having embedded in it a series of flat fibrous bands spirally-arranged and extending from the tread portion down the sides of the tire to points near the rim portion of the tire where the bands are twisted to lie flatwise with respect to the rim.

4. A tire of elastic material having embedded in it a series of flat fibrous bands spirally-arranged and extending from the tread portion down the sides of the tire to points near the rim portion of the tire where the bands are twisted to lie flatwise with respect to the rim, a metallic anchoring loop engaging each twisted portion of the band, these loops being connected together across the tire in pairs.

5. A tire of elastic material having embedded in it a series of flat fibrous bands spirally-arranged and extending from the tread portion down the sides of the tire to points near the rim portion of the tire where the bands are twisted to lie flatwise with respect to the rim, a metallic anchoring loop engaging each twisted portion of the band, these loops being connected together across the tire in pairs, circumferential rings being embedded in the tire for engagement with said anchoring means.

6. A resilient tire provided with a series of spaced slots extending circumferentially of the tire and running through from side to side of the tire, the outer wall of each opening being dished inwardly with reference to circumferential lines, and the opposite wall of each slot being similarly dished.

7. A resilient tire provided with a series of spaced slots extending circumferentially of the tire and running through from side to side of the tire, the outer wall of each opening being dished inwardly with reference to circumferential lines, and the opposite wall of each slot being similarly dished, the outer wall of each opening being also transversely arched outwardly toward the tread and the inner wall being similarly arched.

In testimony whereof we hereunto affix our signatures this 5 day of September, 1917.

CLAIR L. VAN NESS.
FREDERICK A. KRUSEMARK.